Patented June 29, 1954

2,682,498

UNITED STATES PATENT OFFICE 2,682,498

TREATMENT OF SULFURIC ACID SLUDGES CONTAINING AROMATIC SULFONIC ACIDS

Albert J. Shmidl, Houston, Tex., assignor, by mesne assignments, to Standard Oil Development Company, Elizabeth, N. J., a corporation of Delaware No Drawing. Application May 21, 1951,
Serial No. 227,530

3 Claims. (Cl. 196—148)

The present application is directed to a method for treating sulfuric acid sludges containing substantial amounts of aromatic sulfonates.

In the petroleum refining art where hydrocarbon fractions contaminated with small amounts of olefins are to be treated, it is conventional to use sulfuric acid as the treating agent to remove the olefins. When an aromatic fraction contaminated with olefins is treated, it is difficult to dispose of the resulting sulfuric acid sludge in a profitable manner. The present invention is directed to an improved method for treating such sulfuric acid sludges which contain considerable amounts of aromatic sulfonic acids and carbonaceous material.

In accordance with the present invention sulfuric acid sludges containing substantial amounts of aromatic sulfonic acids are recovered by mixing the sludge with a substantial amount of sulfuric acid having a concentration in the range of approximately 60% to 70%. The mixture of acid sludge and acid formed as described is heated to a temperature within the range of about 300° to 330° F. and at the same time vigorously mechanically agitated so as to form granular particles of carbon sufficiently fine so that at least 60% will pass through a 40 mesh screen and at least 75% will pass through a 20 mesh screen. These fine granular particles which result from the heating and vigorous mechanical agitation may be easily separated from the other constituents of the other mixture. That is to say, the aromatic sulfonic acids are hydrolyzed and the carbon is caused to separate in fine granular form by the heating combined with the mechanical agitation. After the sludge has been hydrolyzed as described, two layers may be separated by settling, one of which is an acid phase containing substantially all of the separated carbon in a dry particulate form and the other a hydrocarbon phase consisting of a substantial amount of aromatic material. These phases may be separately recovered.

The amount of acid added to the acid sludge for the hydrolysis step described in the preceding paragraph may be varied over a considerable range and satisfactory results obtained. Thus, from 1 to 4 volumes of acid may be mixed with one volume of the acid sludge. It is preferred to use about two volumes of sulfuric acid for each volume of acid sludge. The acid may be fresh sulfuric acid or recycled sulfuric acid recovered from the operation. It is to be emphasized that the mechanical agitation of the mixture of acid sludge and sulfuric acid during the heating step is essential to my process. This mechanical agitation may be secured by any of the well known mechanical means such as a mechanical stirrer or turbo mixer. The sludge may be heated by any suitable well known means such as the injection of live steam into the mixture, or the use of steam heating coils in the vessel or a steam jacketed reaction vessel or the use of electrical resistance units. In carrying out the process the simultaneous heating and agitation of the mixture may be varied over a considerable range of time and still result in carbon particles sufficiently fine that at least 60% will pass through a 40 mesh screen and 75% will pass through a 20 mesh screen and hence be easily separated by settling. In general, it is desirable to heat and mechanically agitate the mixture for at least two hours and preferably for three hours, while considerably longer periods of time may be used with satisfactory results, if desired.

The present invention will be further described by the following example:

An acid sludge resulted from the treatment with sulfuric acid of a xylene concentrate contaminated with olefins. This sludge contained by analysis approximately 58% sulfuric acid and 21% carbon. This sludge was hydrolyzed by adding one volume of sludge to two volumes of sulfuric acid having a concentration of approximately 60%. The mixture was vigorously mechanically agitated by means of a stirrer and steam was fed into it to maintain the temperature within the range of 300° to 310° F. After the mixture of sludge and sulfuric acid has been maintained at this temperature and vigorously agitated for approximately three hours it was allowed to settle. Upon settling it consisted of an acid phase containing granular carbon particles of which 79% passed through a 20 mesh screen and 67% passed through a 40 mesh screen. The recovered acid fraction consisted of approximately 65 volume percent of the acid sludge originally charged and this recovered acid contained .84% soluble carbon. The hydrocarbon fraction consisted of 28 volume percent of the acid sludge originally charged and this fraction contained about 0.8 weight per cent of unsaturates and the following $C_8$ aromatics:

| | |
|---|---|
| Ethylbenzene | 1.4 |
| Paraxylene | 6.4 |
| Metaxylene | 81.3 |
| Orthoxylene | 7.3 |

For the purpose of describing my invention, "mechanical agitation" is defined as agitation by mechanical means, such as stirrers, paddles, etc. Agitation by injection of steam or vapors, or by injecting liquid into the reaction zone through jets, is not sufficient for purposes of my invention.

While I have described in detail a method for practicing the present invention, it will be understood by a workman skilled in the art that various changes may be made without departing from the scope of the present invention. Having fully described and illustrated the present invention, what I desire to claim as new and useful and to secure by Letters Patent is:

1. A method for treating a sulfuric acid sludge containing aromatic sulfonic acids resulting from treating an aromatic fraction containing olefin with strong sulfuric acid under conditions to remove the olefin therefrom, the steps including admixing said sludge containing aromatic sulfonates with sulfuric acid having a strength within the range of approximately 60% to 70% in an amount within the range of 1 to 4 volumes of acid per volume of said sludge, vigorously mechanically agitating the mixture of sludge and sulfuric acid while maintaining it at a temperature within the range of approximately 300° to 330° F. to form granular particles of carbon sufficiently fine that at least 60% will pass through a 40 mesh screen and at least 75% will pass through a 20 mesh screen and subsequently settling to form an acid phase containing said granular carbon particles and a hydrocarbon phase containing aromatic material and separately recovering said phases.

2. A method in accordance with claim 1 in which two volumes of sulfuric acid are admixed with one volume of sludge.

3. A method for treating an acid sludge containing a substantial amount of metaxylene sulfonate and analyzing approximately 58% sulfuric acid and approximately 21% carbon including the steps of admixing one volume of said acid sludge with approximately two volumes of approximately 60% sulfuric acid and maintaining its temperature at approximately 310° F. while mechanically agitating vigorously to cause substantially all of the carbon in said sludge to form dry granular particles sufficiently fine that approximately 79% pass through a 20 mesh screen and approximately 67% pass through a 40 mesh screen, subsequently settling to form an acid phase containing said dry granular carbon particles and a hydrocarbon phase containing a substantial amount of metaxylene and separately recovering said phases.

References Cited in the file of this patent

UNITED STATES PATENTS

| Number | Name | Date |
| --- | --- | --- |
| 923,429 | Gray | June 1, 1909 |
| 2,067,985 | Sargent | Jan. 19, 1937 |
| 2,244,164 | Lazar et al. | June 3, 1941 |
| 2,414,727 | Ellender | Jan 21, 1947 |
| 2,511,711 | Hetzner | June 13, 1950 |

FOREIGN PATENTS

| Number | Country | Date |
| --- | --- | --- |
| 359,821 | Italy | June 7, 1938 |